United States Patent
Dhakal et al.

(10) Patent No.: US 10,084,552 B2
(45) Date of Patent: Sep. 25, 2018

(54) METHODS, SYSTEMS, AND COMPUTER PROGRAM PRODUCTS FOR CALIBRATING HARDWARE-INDUCED DISTORTION IN A COMMUNICATION SYSTEM

(71) Applicant: Collision Communications, Inc., Portsmouth, NH (US)

(72) Inventors: Sagar Dhakal, Bedford, NH (US); Brandon Hombs, Merrimack, NH (US)

(73) Assignee: COLLISION COMMUNICATIONS, INC., Peterborough, NH (US)

(*) Notice: Subject to any disclaimer, the term of this patent is extended or adjusted under 35 U.S.C. 154(b) by 324 days.

(21) Appl. No.: 14/708,595

(22) Filed: May 11, 2015

(65) Prior Publication Data
US 2016/0337049 A1    Nov. 17, 2016

(51) Int. Cl.
| | |
|---|---|
| H04B 15/02 | (2006.01) |
| H04B 17/11 | (2015.01) |
| H04B 17/21 | (2015.01) |
| H04B 7/06 | (2006.01) |

(52) U.S. Cl.
CPC ............ *H04B 15/02* (2013.01); *H04B 17/11* (2015.01); *H04B 17/21* (2015.01); *H04B 7/0626* (2013.01)

(58) Field of Classification Search
CPC ...... H04B 7/0626; H04B 15/02; H04B 17/11; H04B 17/21
See application file for complete search history.

(56) References Cited

U.S. PATENT DOCUMENTS

| | | | |
|---|---|---|---|
| 5,530,449 A | 6/1996 | Wachs et al. | |
| 7,570,626 B2* | 8/2009 | Murakami | H04B 7/0417 370/203 |
| 8,036,098 B2* | 10/2011 | Pereira | H04W 28/0231 370/201 |
| 8,750,237 B2* | 6/2014 | Pan | H04B 7/0626 370/278 |
| 9,306,725 B2* | 4/2016 | Papasakellariou | H04L 5/1469 |
| 2005/0047384 A1 | 3/2005 | Wax et al. | |
| 2005/0141459 A1 | 6/2005 | Li et al. | |
| 2010/0164782 A1* | 7/2010 | Saha | H04B 7/18515 342/174 |
| 2011/0134774 A1 | 6/2011 | Pelletier et al. | |

(Continued)

OTHER PUBLICATIONS

Haghighat, A., "UE Calibration in MIMO Systems," Sep. 3-6, 2012, Vehicular Technology Conference (VTC Fall), 2012 IEEE, pp. 1-4.

(Continued)

*Primary Examiner* — Asad M Nawaz
*Assistant Examiner* — Kai J Chang (57) ABSTRACT

Methods and systems are described for calibrating hardware-induced distortion in a communication system. In one aspect, a calibration signal is transmitted from a base station (BS) to a user equipment (UE). A corresponding amplified version of the transmitted calibration signal is received by the BS from the UE. A composite downlink-uplink channel state information (CSI) is estimated based on the received corresponding amplified version of the transmitted calibration signal. Uplink CSI is estimated based on a reference signal received from the UE. At least one of a phase hardware-induced distortion and an amplitude hardware induced distortion is determined based on the estimated composite downlink-uplink CSI and the estimated uplink CSI.

20 Claims, 4 Drawing Sheets

(56) References Cited

U.S. PATENT DOCUMENTS

| | | | |
|---|---|---|---|
| 2012/0300864 A1* | 11/2012 | Merlin | H04B 7/0617 375/260 |
| 2013/0058424 A1 | 3/2013 | Enescu et al. | |
| 2013/0322276 A1* | 12/2013 | Pelletier | H04W 72/085 370/252 |
| 2014/0098793 A1* | 4/2014 | Hunukumbure | H04L 5/0023 370/332 |
| 2014/0155006 A1* | 6/2014 | Matsuura | H04B 7/005 455/114.3 |
| 2014/0269554 A1* | 9/2014 | Shapira | H04B 17/0007 370/329 |
| 2014/0321314 A1* | 10/2014 | Fodor | H04W 72/085 370/252 |
| 2015/0010106 A1* | 1/2015 | Skov | H04L 5/0048 375/295 |
| 2015/0195795 A1 | 7/2015 | Loehr et al. | |
| 2015/0222336 A1* | 8/2015 | Yilmaz | H04B 7/024 370/252 |
| 2015/0333850 A1* | 11/2015 | Myoung | H04B 17/11 455/84 |
| 2015/0358847 A1* | 12/2015 | Takahashi | H04W 24/10 370/252 |
| 2015/0381335 A1* | 12/2015 | Khojastepour | H04W 52/14 370/278 |
| 2016/0142094 A1* | 5/2016 | Papadopoulos | H04B 17/14 375/219 |

OTHER PUBLICATIONS

"Evolved Universal Terrestrial Radio Access (E-UTRA); Physical Channels and Modulation," 3GPP TS 36.211 version 10.0.0 Release 10, (Jan. 2011) 105 pages.

"Evolved Universal Terrestrial Radio Access (E-UTRA); Physical Layer Procedures," 3GPP TS 36.213 version 10.1.0 Release 10, (Mar. 2011) 115 pages.

"Evolved Universal Terrestrial Radio Access (E-UTRA) User Equipment (UE) Radio Transmission and Reception," 3GPP TS 36.101 version 10.3.0 Release 10 (Jun. 2011) 236 pages.

Hou, X., et al., "Experimental Study of Advanced MU-MIMO Scheme With Antenna Calibration for the Evolving LTE TDD System," IEEE 23rd International Symposium on Personal Indoor and Mobile Radio Communications (PIMRC), Sep. 9-12, 2012, pp. 2443-2448.

Guey, J-C., et al., "Modeling and Evaluation of MIMO Systems Exploiting Channel Reciprocity in TDD Mode," Vehicular Technology Conference, 2004 VTC2004—Fall 2004 IEEE 60th, Sep. 26-29, 2004, vol. 6, pp. 4265-4269.

Burris, N.E., "Reciprocity Calibration of TDD Smart Antenna Systems," Antennas and Propagation Society International Symposium (APSURSI), Jul. 11-17, 2010, Toronto, Ontario, pp. 1-4.

Spencer, Q. H., et al., "Zero-Forcing Methods for Downlink Spatial Multiplexing in Multiuser MIMO Channels," IEEE Transactions on Signal Processing, vol. 52, No. 2, Feb. 2004, pp. 461-471.

\* cited by examiner

METHODS, SYSTEMS, AND COMPUTER PROGRAM PRODUCTS FOR CALIBRATING HARDWARE-INDUCED DISTORTION IN A COMMUNICATION SYSTEM

RELATED APPLICATIONS

This application is related to U.S. patent application Ser. No. 14/708,586, titled "METHODS, SYSTEMS, AND COMPUTER PROGRAM PRODUCTS FOR CALIBRATING PHASE HARDWARE-INDUCED DISTORTION IN A LONG TERM EVOLUTION COMMUNICATIONS SYSTEM," and U.S. patent application Ser. No. 14/708,588, titled "METHODS, SYSTEMS, AND COMPUTER PROGRAM PRODUCTS FOR CALIBRATING AMPLITUDE HARDWARE-INDUCED DISTORTION IN A LONG TERM EVOLUTION COMMUNICATIONS SYSTEM," both filed on even date herewith, the entire disclosure of both of which are here incorporated by reference.

BACKGROUND

Communication systems, such as for example, the 3GPP long term evolution (LTE) include various transmission schemes involving multiple transmit antennas and multiple receive antennas. Multi-user multiple input multiple output (MU-MIMO) is a set of advanced multiple-input and multiple-output, technologies where the available antennas are spread over a multitude of independent access points, such as base stations, and independent terminals—each having one or more antennas. To enhance the communication capabilities of all terminals, MU-MIMO applies an extended version of space-division multiple access (SDMA) to allow multiple transmitters to send separate signals and multiple receivers to receive separate signals simultaneously in the same band.

One transmission scheme is downlink beamforming, where multiple antennas at the enodeB (eNB), also referred to herein as a base station (BS), transmit to multiple user equipments (UEs) using the same time-frequency resource. The LTE Rel. 10 standard defines a codebook for up to eight transmit antennas per BS.

Beamforming is a signal processing technique involving directional signal transmission or reception. This is achieved by combining elements in a phased array in such a way that signals at particular angles experience constructive interference while others experience destructive interference. Beamforming can be used at both the transmitting and receiving ends in order to achieve spatial selectivity. In a centralized radio access network (C-RAN), multiple transmit antennas across multiple BS can be utilized to jointly beamform over a large geographic area. The C-RAN system has the potential to provide a significant gain in spectral efficiency and better network coverage. However, co-channel interference, if not efficiently controlled or cancelled, limits these advantages.

Channel state information (CSI), which refers to known channel properties of a communication link, can be used to control co-channel interference. This information describes how a signal propagates from the transmitter to the receiver and represents the combined effect of, for example, scattering, fading, and power decay with distance, making it possible to adapt transmissions to current channel conditions. CSI is typically estimated at the receiver and quantized and fed back to the transmitter.

A transmit beamforming algorithm can preemptively remove or reduce the interference in a MU-MIMO system. Block diagonalization and zero-forcing are two well-known beamforming techniques that utilize the downlink channel state information (DL-CSI) of users to perform linear precoding of their signals before transmission in order to cancel the co-channel interference. The performance of these beamforming techniques rely on the accuracy of the DL-CSI. Hardware-induced phase and/or amplitude distortion that is introduced by BS and/or UE transmit and/or receive chains, however, prevents an accurate determination of DL-CSI.

Accordingly, there exists a need for methods, systems, and computer program products for calibrating hardware-induced distortion in a communication system.

SUMMARY

Methods and systems are described for calibrating hardware-induced distortion in a communication system. In one aspect, a calibration signal is transmitted from a BS to a UE. A corresponding amplified version of the transmitted calibration signal is received by the BS from the UE. A composite downlink-uplink CSI is estimated based on the received corresponding amplified version of the transmitted calibration signal. Uplink CSI is estimated based on a reference signal received from the UE. At least one of a phase hardware-induced distortion and an amplitude hardware induced distortion is determined based on the estimated composite downlink-uplink CSI and the estimated uplink CSI.

Although LTE-specific terminology is used herein in some cases, it will be understood the subject matter described herein is not limited to LTE communication systems and may be implemented in other communication systems using analogous signaling, devices, and techniques.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
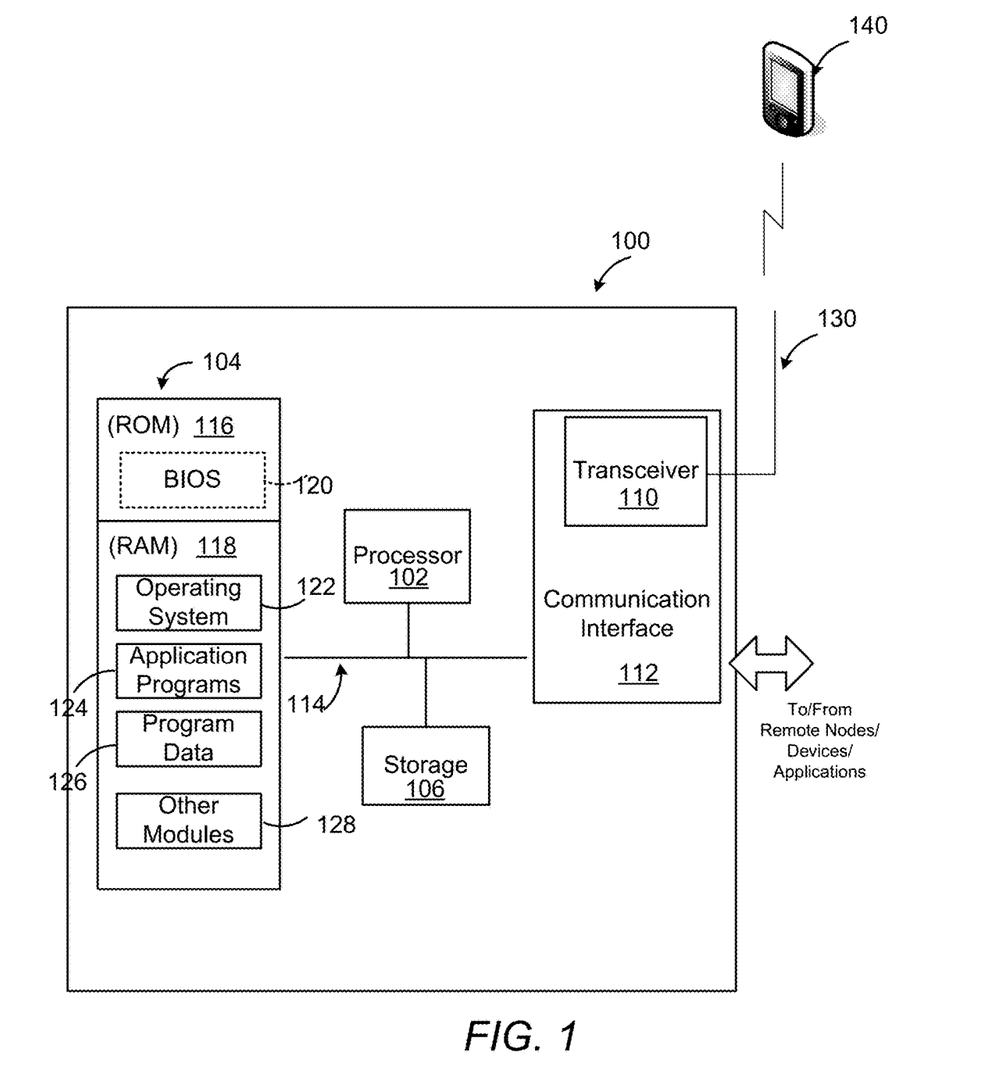
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station (not shown) configured to communicate with mobile devices 140 in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices 140 via a transceiver 110 connected to an antenna 130. The mobile devices 140 can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). LTE and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Although LTE-specific terminology is used herein in some cases, it will be understood the subject matter described herein is not limited to LTE communication systems and may be implemented in other communication systems using analogous signaling, devices, and techniques.

Figure 4:
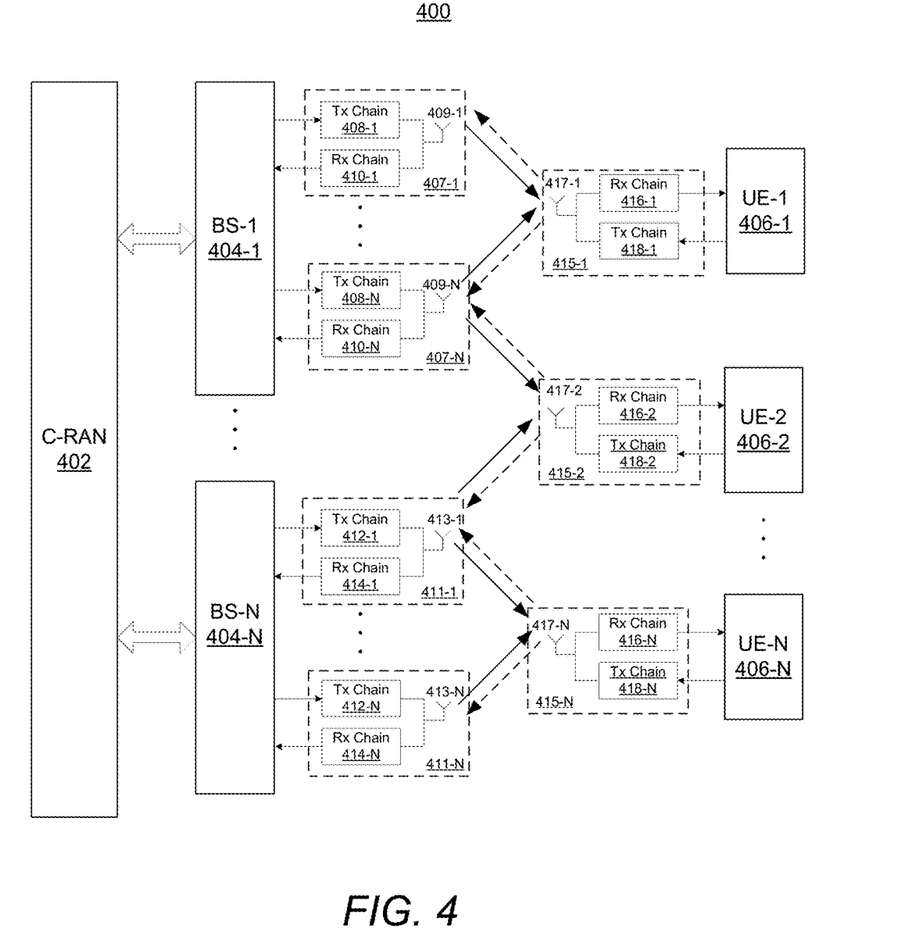
FIG. 4 is a block diagram illustrating a configuration for an exemplary MU-MIMO communications system according to another aspect of the subject matter described herein.

FIG. 4 illustrates one configuration for a MU-MIMO communications system 400. The C-RAN 402 communicates with one or more BSs 404-1 to 404-N, which in turn transmit downlink signals (shown with solid lines) to UEs 406-1 to 406-N via BS transmit chains 408-1 to 408-N and 412-1 to 412-N and receive uplink signals (shown with dashed lines) from UEs 406-1 to 406-N via BS receive chains 410-1 to 410-N and 414-1 to 414-N, both via respective associated antennas 409-1 to 409-N and 413-1 to 413-N, correspondingly. UEs 406-1 to 406-N receive downlink signals from BSs 404-1 to 404-N via UE receive chains 416-1 to 416-N and transmit uplink signals to BSs 404-1 to 404-N via UE transmit chains 418-1 to 418-N, both via respective associated antennas 417-1 to 417-N, correspondingly. A transmit chain includes the components necessary to transmit a signal and a receive chain includes all the components necessary to receive a signal. Transmit and receive chains together make up a transceiver chain 407. For example, BS transmit chain 408-1, antenna 409-1, and BS receive chain 410-1 together make up a BS transceiver chain 407-1. Similarly, UE transmit chain 418-1, antenna 417-1, and UE receive chain 416-1 together make up a UE transceiver chain 415-1. As can be appreciated, in a MU-MIMO system, multiple input and out antennas are employed and thus multiple transceiver chains are employed.

Each BS 404 is communicatively coupled to C-RAN 402 such that certain operations may be performed by the BS 404, by the C-RAN 402, or by a combination of both. Each BS 404 may, in some embodiments, be considered a part of the C-RAN 402 such that operations performed at a BS 404 are performed by the C-RAN 402 by extension.

Various operations are described herein with respect to a particular BS 404. It should be understood that these operations may be performed by multiple BS's 404 each with respective or the same UEs 406 and that these multiple operations may be aggregated by the C-RAN 402 for the purposes of hardware-induced phase and amplitude distortion calibration or any other operation described herein.

In order to perform MU-MIMO beamforming for a communication system, such as in the case of an LTE-based communication system, an accurate estimate of DL-CSI is needed. Generally speaking, DL-CSI can be determined roughly from knowledge of the uplink channel state information (UL-CSI) due to reciprocity between the uplink and downlink air propagation channels. The UL-CSI from UEs 406 to BSs 404 is obtained at the BSs 404 by channel estimation using received sounding reference signal (SRS) symbols. In order to derive an accurate DL-CSI from the UL-CSI, however, compensation for the effects of hardware-induced phase and/or amplitude distortion that is introduced by transceiver chains at one or more BSs should be considered.

More particularly, each BS 404 antenna suffers from a random phase distortion induced by its transceiver chain. By way of example, respective to BS-1 404-1, the transmit chain 408-1 can introduce a random phase distortion $\delta_1$ to a signal transmitted via its associated antenna 409-1 and the receive chain 410-1 can introduce a random phase distortion $\tau_1$ to a signal received via its associated antenna 409-1. Similarly, the transmit chain 408-N can introduce a random phase distortion $\delta_N$ to a signal transmitted via its associated antenna 409-N and the receive chain 410-N introduces a random phase distortion $\tau_N$ to a signal received via its associated antenna 409-N. Unless the phase distortion at each BS antenna is calibrated, both block diagonalization and the zero-forcing (ZF) beamformer will project each UEs 406 downlink signal in random sub-spaces and the co-channel interference between UEs 406 increases as a result.

In addition, the DL-CSI is impacted by an amplitude distortion at the transmit chain of the BS 404 and the receive chain of the UE 406. By way of example, respective to BS-1 404-1, the transmit chain 408-1 can introduce amplitude distortion to a signal transmitted downlink via its associated antenna 409-1 and the receive chain 417-1 can introduce an amplitude distortion to a signal received via its associated antenna 409-1. As a result of this hardware-induced amplitude distortion, the downlink pathloss may not be accurately determinable from knowledge of the uplink pathloss. Knowledge of the downlink pathloss, however, can provide an optimal power allocation across UEs as explained below. Accordingly, the amplitude distortion is ideally compensated to improve beamforming accuracy.

According to an aspect, an amplify-and-forward scheme that enables the BS to directly estimate the DL-CSI is described herein. More specifically, during hardware calibration instances, each BS antenna simultaneously transmits calibration signal to one or more UEs 406. The calibration signals across antennas are preferably designed to be orthogonal. Each UE 406 that receives the calibration signals, amplifies and transmits them back to the BS 404. The BS 404 and/or C-RAN 402 can measure the received calibration signals to estimate the downlink-uplink composite CSI. The UL-CSI estimate is also available at the BS 404 from separate reference signals transmitted by the UEs 406. The BS 404 and/or C-RAN can normalize the DL-CSI by the UL-CSI to obtain the non-reciprocal component of the uplink-downlink channel. The non-reciprocal component can thereafter be used to compute a calibration matrix. As the hardware impairments vary slowly over time (compared to the variation in a free-space propagation channel), calibration instances can be spaced out over several minutes, while the UL-CSI can be measured every millisecond. The measure UL-CSI together with the calibration matrix will provide an accurate prediction of DL-CSI that can be used to design an effective transmit beamforming filter for a MU-MIMO system.

Figure 2:
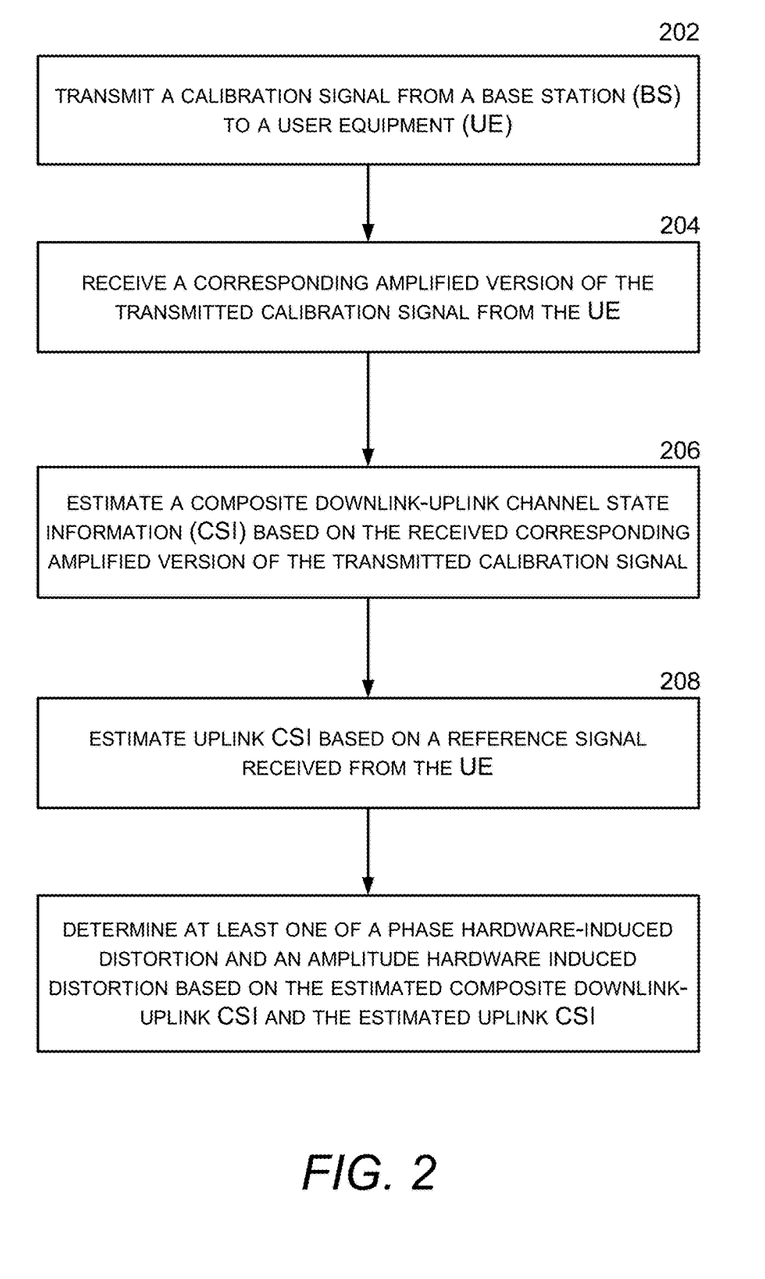
FIG. 2 is a flow diagram illustrating a method for calibrating hardware-induced distortion in a communication system according to an aspect of the subject matter described herein.
Figure 3:
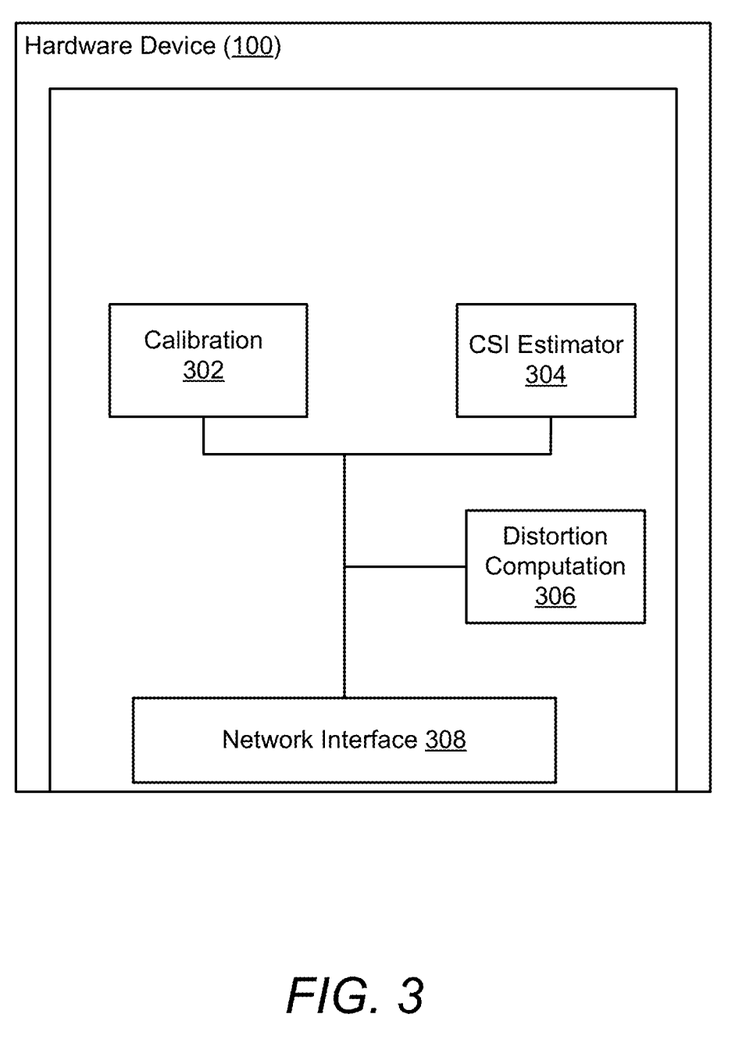
FIG. 3 is a block diagram illustrating an arrangement of components for calibrating hardware-induced distortion in a communication system according to another aspect of the subject matter described herein.

Turning now to FIG. 2, a flow diagram is illustrated illustrating a method for calibrating hardware-induced distortion in a communication system according to an exemplary aspect of the subject matter described herein. FIG. 3 is a block diagram illustrating an arrangement of components for calibrating hardware-induced distortion in a communication system according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement in FIG. 3 operating in an a compatible execution environment, such as the environment provided by some or all of the components of the arrangement in FIG. 1. The arrangement of components in FIG. 3 may be implemented by some or all of the components of the hardware device 100 of FIG. 1.

With reference to FIG. 2, in block 202 a calibration signal is transmitted from a BS 404 to a UE 406. Accordingly, a system for calibrating hardware-induced distortion in a communication system includes means for transmitting a calibration signal from a BS 404 to a UE 406. For example, as illustrated in FIG. 3, a calibration component 302 can be configured to transmit a calibration signal from a BS 404 to a UE 406.

For example, a calibration component 302 can be configured transmit via a network interface 308 a calibration signal to one or more UEs 406. In one aspect, the calibration signal can be orthogonal to other contemporaneously transmitted signals. For example, the calibration signal can be a ZAdoff-chu sequence. In another aspect, the calibration signal can be a pseudo-random sequence.

In an aspect, the calibration component 302 selects the one or more UEs 406 to transmit to based on at least one of CQI and an SRS schedule. For example, UEs 406 can be statically scheduled to amplify and forward the calibration signal in the same sub-frame where they are also scheduled by BS 404 and/or C-RAN 402 to transmit SRS. Alternatively, BS 404 and/or C-RAN 402 can utilize the CQI report from the UEs 406 and dynamically assign only those UEs 406 in better channel conditions to amplify and forward the calibration signal. In another example, BS 404 and/or C-RAN 402 can utilize the power headroom report to determine a list of UEs 406 that have enough power to amplify and forward calibration signals.

In another aspect, the calibration signal is transmitted several orders of magnitude less frequently than reference signals are received from the UE 406. For example, since the hardware impairments vary slowly over time (compared to the variation in a free-space propagation channel), calibration instances can be spaced out over several minutes, while the UL-CSI can be measured every millisecond.

Returning to FIG. 2, in block 204 a corresponding amplified version of the transmitted calibration signal is received by the BS 404 from the UE 402. Accordingly, a system for calibrating hardware-induced distortion in a communication system includes means for receiving, by the BS 404, a corresponding amplified version of the transmitted calibration signal from the UE 406. For example, as illustrated in FIG. 3, the calibration component 302 can be configured to receive a corresponding amplified version of the transmitted calibration signal from the UE 406.

For example, the calibration component 302 can be configured to receive via the network interface 308 a corresponding amplified version of the calibration signal from the one or more UEs 406, each participating UE 406 having amplified and forwarded the calibration signals back to the BS 404.

Returning to FIG. 2, in block 206 a composite downlink-uplink CSI is estimated based on the received corresponding amplified version of the transmitted calibration signal.

Accordingly, a system for calibrating hardware-induced distortion in a communication system includes means for estimating a composite downlink-uplink CSI based on the received corresponding amplified version of the transmitted calibration signal. For example, as illustrated in FIG. 3, a CSI estimator component 304 can be configured to estimate a composite downlink-uplink CSI based on the received corresponding amplified version of the transmitted calibration signal.

In one aspect, the BS 404 can perform channel estimation using the received amplified version of the calibration signal(s) and obtain a set of equations that have downlink-uplink composite CSI as unknown variables. For example, BS 404-1 can transmit through a transmit chain 408-$n$, where n=1, . . . , N, an orthogonal calibration sequence $X_n$ comprising signals $X_n(1)$ to $X_n(F)$ using F channels. In one instance, F can be a sub-set of orthogonal frequency multiplexed sub-carriers used in the communication system. A given UE 406-$m$ can receive a combined signal through its receive chain 416-$m$ given by:

$$Y_m(f) = \sum_{n=1}^{N} \sqrt{P} a_m e^{i\kappa_m} g_{mn} e^{i\phi_{mn}} b_n e^{i\delta_n} X_n(f) + N_m(f), \quad (1)$$
$$f = 1, \ldots, F$$

where P is the BS-1 404-1 per antenna transmit power; $a_m$, $g_{mn}$, and $b_n$ are the amplitude attenuation induced by receive chain 416-$m$, the free-air propagation between antenna 409-$n$ and 417-$m$, and transmit chain 408-$n$, respectively; and $k_m$, $\varphi_{mn}$, and $\delta_n$ are the phase attenuation induced by receive chain 416-$m$, free-air propagation between antenna 409-$n$ and 417-$m$, and transmit chain 408-$n$, respectively; $N_m(f)$ is additive white Gaussian noise at the receiver on channel f; and i=$\sqrt{-1}$. For simplicity of notation, the downlink channel between transmit chain 408-$n$ and receive chain 416-$m$ can be defined as: $D_m \sqrt{P} a_m e^{i\kappa_m} g_{mn} e^{i\varphi_{mn}} b_n e^{i\delta_n}$.

Next, UE 406-$m$, for m=1, M, can amplify the received calibration signal $Y_m(f)$ and transmit through its transmit chain 418-$m$. BS-1 404-1 receives a combined amplified and forwarded calibration signal through its receive chains 410-1 to 410-N, each of which can be represented as:

$$Z_n(f) = \sum_{m=1}^{M} \sqrt{p_m} c_n e^{i\gamma_n} h_{nm} e^{i\psi_{nm}} d_m e^{i\lambda_m} Y_m(f) + W_n(f), \quad (2)$$
$$f = 1, \ldots, F,$$

where $p_m$ is the UE 406-$m$ per antenna transmit power; $c_n$, $h_{nm}$, and $d_m$ are the amplitude attenuation induced by receive chain 410-$n$, free-air propagation between antenna 417-$m$ and 409-$n$, and transmit chain 418-$m$, respectively; and $\tau_n$, $\psi_{nm}$, and $\lambda_m$ are the phase attenuation induced by receive chain 410-$n$, free-air propagation between antenna 417-$m$ and 409-$n$, and transmit chain 418-$m$, respectively; $W_n(t)$ is additive white Gaussian noise at the receiver on channel f; and i=$\sqrt{-1}$. For simplicity of notation, we define the uplink channel between Tx chain 418-$m$ to receive chain 410-$n$ to be: $U_{nm} = \sqrt{p_m} c_n e^{i\gamma_n} h_{nm} e^{i\psi_{nm}} d_m e^{i\lambda_m}$.

Assuming that the channels are constant over the set of F sub-carriers, Equations (1) and (2) can be rearranged into the following matrix equation:

$$\begin{pmatrix} Z_n(1) \\ Z_n(2) \\ \vdots \\ Z_n(F) \end{pmatrix} = \begin{pmatrix} X_1(1) & X_2(1) & \ldots & X_N(1) \\ X_1(2) & X_2(2) & \ldots & X_N(2) \\ \vdots & \vdots & & \vdots \\ X_1(F) & X_2(F) & \ldots & X_N(F) \end{pmatrix} \begin{pmatrix} \sum_{m=1}^{M} U_{nm} D_{m1} \\ \sum_{m=1}^{M} U_{nm} D_{m2} \\ \vdots \\ \sum_{m=1}^{M} U_{nm} D_{mN} \end{pmatrix} + \begin{pmatrix} Q_n(1) \\ Q_n(2) \\ \vdots \\ Q_n(F) \end{pmatrix} \quad (3)$$

where $Q_n$ is composite sum of noise samples. Equation (3) can be enumerated for each receive chain 410-1 to 410-N at BS 404-1. A least square solution to Equation (3) provides a set of solutions $t_{nq}$, n, q=1, . . . , N such that:

$$\sum_{m=1}^{M} U_{nm} D_{mq} = t_{nq} \quad (4)$$

The uplink channels $U_{nm}$ can be separately estimated at the BS 404 using received SRS symbols and/or demodulation reference signal (DMRS) symbols transmitted by the UEs 406. Therefore, with knowledge of $U_{nm}$ the set of linear equations in (4) can be solved to obtain the downlink channel estimates $D_{mq}$.

It should be noted that the above-described method may also be used to determine a DL-CSI estimate at the BS 404 for a frequency division duplex (FDD) system.

Returning to FIG. 2, in block 208 UL-CSI is estimated based on a reference signal received from the UE. Accordingly, a system for calibrating hardware-induced distortion in a communication system includes means for estimating UL-CSI based on a reference signal received from the UE. For example, as illustrated in FIG. 3, the CSI estimator component 304 can be configured to estimate UL-CSI based on a reference signal received from the UE.

In one aspect, the reference signal received from the UE can be at least one of an SRS and a DMRS, as described above.

Returning to FIG. 2, in block 210 at least one of a phase hardware-induced distortion and an amplitude hardware-induced distortion is determined based on the estimated composite downlink-uplink CSI and the estimated UL-CSI. Accordingly, a system for calibrating hardware-induced distortion in a communication system includes means for determining at least one of a phase hardware-induced distortion and an amplitude hardware induced distortion based on the estimated composite downlink-uplink CSI and the estimated UL-CSI. For example, as illustrated in FIG. 3, a distortion compensation component 306 can be configured to determine at least one of a phase hardware-induced distortion and an amplitude hardware induced distortion based on the estimated composite downlink-uplink CSI and the estimated UL-CSI.

In one aspect, the distortion compensation component 306 can be configured to determine a DL-CSI calibrated for hardware impairments by computing a calibration matrix based on a non-reciprocal component determined based on the estimated composite downlink-uplink CSI and the estimated UL-CSI. For example, with the knowledge of UL-CSI estimates, the system of equations for the composite downlink-uplink CSI can be reduced to a system of linear equations that can be solved to obtain DL-CSI estimate as described above.

In one aspect, the distortion compensation component 306 can be further configured to determine the DL-CSI calibrated for hardware impairments based on the determined at least one of a phase hardware-induced distortion and amplitude hardware induced distortion.

Normalizing the DL-CSI estimate by the UL-CSI estimate provides the non-reciprocal hardware-induced phase and amplitude distortion for each channel. More precisely, $$\frac{D_{mn}}{U_{nm}} = \sqrt{\frac{P}{p_m}} \frac{b_n}{c_n} e^{i(\delta_n - \gamma_n)} \frac{g_{mn}}{h_{nm}} e^{i(\phi_{mn} - \psi_{nm})} \frac{a_m}{d_m} e^{i(\kappa_m - \lambda_m)} \quad (5)$$

It should be noted that for a time division duplex (TDD) system, reciprocity between uplink and downlink propagation channel can be exploited to write $g_{mn} = h_{nm}$, and $\varphi_{mn} = \psi_{nm}$, which when applied to Equation (5) results in:

$$\frac{D_{mn}}{U_{nm}} = \sqrt{\frac{P}{p_m}} \frac{b_n}{c_n} e^{i(\delta_n - \gamma_n)} \frac{a_m}{d_m} e^{i(\kappa_m - \lambda_m)} \quad (6)$$

Using Equation (6) and knowledge of transmit powers P and $p_m$ calibration coefficients, given by:

$$\beta_{nm} = \frac{b_n}{c_n} e^{i(\delta_n - \gamma_n)} \frac{a_m}{d_m} e^{i(\kappa_m - \lambda_m)},$$

are obtained for the hardware-induced phase and amplitude distortion. UE 406 transmit power $p_m$ can be estimated from the power headroom report sent by the UE 406 and the uplink power control algorithm. In the downlink data transmission stage, which is in the order of milliseconds, the BS 406 performs channel estimation on the reference signals transmitted by the UEs 406 to obtain the UL-CSI estimates, applies the respective calibration coefficient to the UL-CSI in order to estimate the DL-CSI, and designs the transmit beamformer based on the predicted DL-CSI.

The transmit beamformer can be, for example, a zero-forcing transmit beamformer with equal power allocation across all UEs 406. Alternatively, the transmit beamformer may be optimized to perform downlink power allocation.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for calibrating hardware-induced distortion in a communication system, the method comprising:
   transmitting a calibration signal from a base station (BS) to a user equipment (UE);
   receiving, by the BS, a corresponding amplified version of the transmitted calibration signal from the UE;
   estimating a composite downlink-uplink channel state information (CSI) based on the received corresponding amplified version of the transmitted calibration signal;
   estimating uplink CSI based on a reference signal received from the UE;
   determining at least one of a phase hardware-induced distortion and an amplitude hardware-induced distortion based on the estimated composite downlink-uplink CSI and the estimated uplink CSI; and
   determining a downlink CSI calibrated for hardware impairments based on the determined at least one of a phase hardware-induced distortion and amplitude hardware induced distortion,
   wherein at least one of the preceding actions is performed on at least one electronic hardware component.

2. The method of claim 1, wherein determining the downlink CSI calibrated for hardware impairments includes computing a calibration matrix based on a nonreciprocal component determined based on the estimated composite downlink-uplink CSI and the estimated uplink CSI.

3. The method of claim 1 comprising selecting the UE by the BS based on at least one of a channel quality indicator (CQI) and a sounding reference signal (SRS) schedule.

4. The method of claim 1 wherein the calibration signal is orthogonal to other contemporaneously transmitted signals.

5. The method of claim 4 wherein the calibration signal is a ZAdoff-chu sequence.

6. The method of claim 1 wherein the calibration signal is a pseudo-random sequence.

7. The method of claim 1 wherein the reference signal received from the UE is at least one of an SRS and a demodulation reference signal (DMRS).

8. The method of claim 1 wherein the calibration signal is transmitted several orders of magnitude less frequently than the reference signals are received from the UE.

9. The method of claim 1 comprising estimating downlink CSI based on the reference signal received from the UE.

10. A system for calibrating hardware-induced distortion in a communication system, the system comprising:

means for transmitting a calibration signal from a BS to a UE; means for receiving, by the BS, a corresponding amplified version of the transmitted calibration signal from the UE;

means for estimating a composite downlink-uplink CSI based on the received corresponding amplified version of the transmitted calibration signal;

means for estimating uplink CSI based on a reference signal received from the UE;

means for determining at least one of a phase hardware-induced distortion and an amplitude hardware-induced distortion based on the estimated composite downlink-uplink CSI and the estimated uplink CSI; and determining a downlink CSI calibrated for hardware impairments based on the determined at least one of a phase hardware-induced distortion and amplitude hardware induced distortion, wherein at least one of the means includes at least one electronic hardware component.

11. A system for calibrating hardware-induced distortion in a communication system, the system comprising system components including:

a calibration component configured to transmit a calibration signal from a BS to a UE and to receiving, by the BS, a corresponding amplified version of the transmitted calibration signal from the UE;

a CSI estimator component configured to estimate a composite downlink-uplink CSI based on the received corresponding amplified version of the transmitted calibration signal and to estimate uplink CSI based on a reference signal received from the UE; and a distortion compensation component configured to determine at least one of a phase hardware-induced distortion and an amplitude hardware-induced distortion based on the estimated composite downlink-uplink CSI and the estimated uplink CSI, and to determine a downlink CSI calibrated for hardware impairments based on the determined at least one of a phase hardware-induced distortion and amplitude hardware induced distortion, wherein at least one of the system components includes at least one electronic hardware component.

12. The system of claim 11 wherein the distortion compensation component is configured to determine the downlink CSI calibrated for hardware impairments by computing a calibration matrix based on a non-reciprocal component determined based on the estimated composite downlink-uplink CSI and the estimated uplink CSI.

13. The system of claim 11 wherein the calibration component selects the UE to transmit to based on at least one of a CQI and a SRS schedule.

14. The system of claim 11 wherein the calibration signal is orthogonal to other contemporaneously transmitted signals.

15. The system of claim 14 wherein the calibration signal is a ZAdoff-chu sequence.

16. The system of claim 11 wherein the calibration signal is a pseudo-random sequence.

17. The system of claim 11 wherein the reference signal received from the UE is at least one of an SRS and a DMRS.

18. The system of claim 11 wherein the calibration signal is transmitted several orders of magnitude less frequently than the reference signals are received from the UE.

19. The system of claim 11 wherein the CSI estimator component is configured to estimate a downlink CSI based on a reference signal received from the UE.

20. A computer readable medium storing a computer program, executable by a machine, for calibrating hardware-induced distortion in a communication system, the computer program comprising executable instructions for:

transmitting a calibration signal from a BS to a UE; receiving, by the BS, a corresponding amplified version of the transmitted calibration signal from the UE;

estimating a composite downlink-uplink CSI based on the received corresponding amplified version of the transmitted calibration signal;

estimating uplink CSI based on a reference signal received from the UE; and determining at least one of a phase hardware-induced distortion and an amplitude hardware-induced distortion based on the estimated composite downlink-uplink CSI and the estimated uplink CSI; and determining a downlink CSI calibrated for hardware impairments based on the determined at least one of a phase hardware-induced distortion and amplitude hardware induced distortion.

* * * * *